(12) United States Patent
Sheets et al.

(10) Patent No.: US 12,112,315 B2
(45) Date of Patent: Oct. 8, 2024

(54) MULTI-DEVICE AUTHENTICATION PROCESS AND SYSTEM UTILIZING CRYPTOGRAPHIC TECHNIQUES

(71) Applicant: Visa International Service Association, San Francisco, CA (US)

(72) Inventors: John F. Sheets, San Francisco, CA (US); Kim Wagner, Sunnyvale, CA (US); Christian Aabye, Foster City, CA (US); Jing Jin, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 709 days.

(21) Appl. No.: 16/312,231

(22) PCT Filed: Jul. 29, 2016

(86) PCT No.: PCT/US2016/044832
§ 371 (c)(1),
(2) Date: Dec. 20, 2018

(87) PCT Pub. No.: WO2018/022104
PCT Pub. Date: Feb. 1, 2018

(65) Prior Publication Data
US 2019/0279199 A1 Sep. 12, 2019

(51) Int. Cl.
*G06Q 20/36* (2012.01)
*G06F 21/30* (2013.01)
(Continued)

(52) U.S. Cl.
CPC ......... *G06Q 20/3674* (2013.01); *G06F 21/30* (2013.01); *G06F 21/44* (2013.01);
(Continued)

(58) Field of Classification Search
CPC .......................... G06Q 20/36; G06F 20/01–99
(Continued)

(56) References Cited

U.S. PATENT DOCUMENTS 8,768,765 B1 * 7/2014 Kato .................. G06Q 30/0242
705/14.4
2007/0240129 A1 * 10/2007 Kretzschmar ........... H03M 7/24
717/136
(Continued)

FOREIGN PATENT DOCUMENTS

CN 102598037 A 7/2012
CN 103282923 A 9/2013
(Continued)

OTHER PUBLICATIONS

EP16910763.8 , "Extended European Search Report", Jan. 2, 2020, 8 pages.
(Continued)

*Primary Examiner* — John W Hayes
*Assistant Examiner* — Cristina Owen Sherr
(74) *Attorney, Agent, or Firm* — Kilpatrick Townsend & Stockton LLP (57) ABSTRACT

In a system for verifying transactions, when a user with a portable communication device nears a resource provider location, the portable communication device provides an indication to a transaction processing system of its proximity to the location. The portable communication device then provides a universally unique identifier (UUID) of a base station of the resource provider to the transaction processing system, which generates a hash using the UUID and a primary account number (PAN) of a portable transaction device that is associated with the portable communication device. When the user conducts a transaction with the portable transaction device at the provider, the provider (Continued)

generates a separate hash from the UUID and the PAN and sends the hash to the transaction processing system, A match between the hashes is taken into account as a positive indicator that the transaction is not fraudulent and the resource provider is complying with the system.

20 Claims, 5 Drawing Sheets

(51) Int. Cl.
  *G06F 21/44* (2013.01)
  *G06Q 20/32* (2012.01)
  *H04L 9/32* (2006.01)
  *H04W 12/63* (2021.01)

(52) U.S. Cl.
  CPC ..... *G06Q 20/3227* (2013.01); *G06Q 20/3278* (2013.01); *G06Q 20/3672* (2013.01); *H04L 9/3236* (2013.01); *H04W 12/63* (2021.01)

(58) Field of Classification Search
  USPC .......................................................... 705/67
  See application file for complete search history.

(56) References Cited

U.S. PATENT DOCUMENTS

| | | | |
|---|---|---|---|
| 2008/0172339 | A1 | 7/2008 | Cato et al. |
| 2008/0212771 | A1* | 9/2008 | Hauser ................. G07F 7/1008 726/6 |
| 2009/0154468 | A1* | 6/2009 | Donovan ................ H04L 47/10 370/395.21 |
| 2009/0254440 | A1* | 10/2009 | Pharris ................ G06Q 20/204 705/40 |
| 2010/0180009 | A1* | 7/2010 | Callahan ............. H04L 12/1813 709/217 |
| 2011/0047075 | A1* | 2/2011 | Fourez .................. G06Q 20/40 705/44 |
| 2011/0185174 | A1 | 7/2011 | Blewett et al. |
| 2012/0072979 | A1* | 3/2012 | Cha .................... H04W 12/069 726/8 |
| 2012/0330769 | A1 | 12/2012 | Arceo |
| 2013/0167208 | A1* | 6/2013 | Shi .......................... H04L 63/18 726/5 |
| 2013/0191290 | A1* | 7/2013 | Glendenning ........ H04L 9/3247 705/71 |
| 2013/0246203 | A1 | 9/2013 | Laracey |
| 2014/0138447 | A1* | 5/2014 | Goldman ......... G06K 19/06206 235/492 |
| 2014/0150080 | A1 | 5/2014 | Miller et al. |
| 2015/0095238 | A1* | 4/2015 | Khan ................... G06Q 20/382 705/71 |
| 2015/0215299 | A1* | 7/2015 | Burch ................. H04W 12/069 726/5 |
| 2015/0222636 | A1 | 8/2015 | Mahaffey et al. |
| 2015/0278487 | A1* | 10/2015 | Scott ..................... H04L 9/3239 726/28 |
| 2015/0339665 | A1 | 11/2015 | Hayhow et al. |
| 2016/0180072 | A1* | 6/2016 | Ligatti .................... G06F 21/40 726/7 |
| 2016/0277380 | A1 | 9/2016 | Wagner et al. |

FOREIGN PATENT DOCUMENTS

| | | |
|---|---|---|
| CN | 104272332 A | 1/2015 |
| CN | 105723388 A | 6/2016 |
| WO | 2011112752 A1 | 9/2011 |

OTHER PUBLICATIONS

Application No. BR1120180774618 , Office Action, Mailed On Aug. 18, 2020, 4 pages.
EP16910763.8 , "Office Action", May 28, 2021, 5 pages.
SG11201809930X , "Notice of Decision to Grant", Apr. 23, 2021, 5 pages.
International Search Report and Written Opinion, mailed Apr. 11, 2017, in PCT Application No. PCT/US2016/044832, 11 pages.
SG11201809930X , "Written Opinion", Apr. 16, 2020, 7 pages.
CN201680088042.2 , "Office Action", Jul. 22, 2021, 17 pages.
BR1120180774618 , "Office Action", Oct. 31, 2023, 6 pages.
SG10202106761W , "Written Opinion", Jun. 12, 2024, 9 pages.

* cited by examiner

MULTI-DEVICE AUTHENTICATION PROCESS AND SYSTEM UTILIZING CRYPTOGRAPHIC TECHNIQUES

CROSS-REFERENCES TO RELATED APPLICATIONS

This application is the U.S. National Phase of PCT Application No. PCT/US2016/044832, filed Jul. 29, 2016, the disclosure of which is incorporated by reference.

BACKGROUND

Electronic access transactions are susceptible to fraud. For example, a credit card can be stolen or fabricated, and used in a fraudulent card-present transaction at a merchant even though the true owner of the card is not present at the merchant. In another example, a person's access badge may be stolen and an unauthorized person may attempt to enter a location where they would not be otherwise authorized to enter.

With regard to fraudulent payment transactions, it has been reported that merchants are losing over $190 billion dollars per year in credit card fraud. Further, the ability for unauthorized users to access locations or data where they are not authorized to do so can present safety and security risks.

Increased security can be provided by simply implementing more and more authentication procedures. However, this is not desirable, because implementing too many authentication procedures can deter legitimate users from conduct legitimate transactions. For example, requiring a user to remember multiple passwords to conduct a single transaction can be so frustrating to the user, that the user may not want to conduct that transaction at all.

While systems that employ two-factor authentication to prevent fraud exist, these systems may require participating merchants to perform a registration process, which, for each participating merchant, may involve the transmission or creation of an identifier unique to the merchant. In scenarios involving a high number of merchants, creating and maintaining infrastructure (e.g., a database and registration personnel) to manage merchant-specific identifiers may be burdensome. Additionally, the requirement to register may dissuade other merchants from participating in the system.

Furthermore, while many existing fraud prevention systems may be directed towards preventing fraudulent transactions caused by customers and/or other non-merchant actors, these same systems may trust merchant participants to correctly perform certain operations of the fraud prevention system without actually verifying whether these operations are actually performed correctly. As a result, such systems may not be able to detect rogue merchants that engage in fraudulent behavior or merchants that are not in compliance.

Embodiments of the invention address this and other problems, individually and collectively.

BRIEF SUMMARY

Embodiments of the invention are directed to systems and methods for ensuring that transactions are conducted by authorized users and ensuring that resource providers are not acting in an insecure or fraudulent manner, wherein the systems and methods circumvent the need for resource provider registration.

One embodiment of the invention is directed to a method. The method comprises receiving, by a server computer, device information from a portable communication device of a user, a base station identifier that uniquely identifies a resource provider location and a first cryptographic pattern formed from hashing at least a credential or a token; hashing, by the server computer, at least the first cryptographic pattern and the base station identifier to form a second cryptographic pattern; receiving, by the server computer, an authorization request message comprising at least part of a second cryptographic pattern from a access device in a transaction; and analyzing, by the server computer, the authorization request message to determine that the user of the portable communication device is also conducting the transaction at the access device.

Other embodiments of the invention are directed to one or more server computers, each comprising: a processor; and a computer readable medium comprising code, executable by the processor, for implementing the above-described methods.

These and other embodiments of the invention are described in further detail below.

DETAILED DESCRIPTION

Embodiments of the present invention provide techniques for verifying a transaction based upon the presence of a user's portable communication device being at a location such as a resource provider location. As an illustration, in embodiments of the invention, when a user enters a merchant store with a portable communication device, the portable communication device provides an indication to a transaction processing system that the portable communication device is currently at the merchant location. At a later time, when the user conducts a transaction with a portable transaction device (which may be separate and different from the portable communication device), the fact that the user's portable communication device had been detected at the merchant store a short time ago is taken into account as a positive indicator that the transaction is not fraudulent. Additionally, during the transaction, the merchant store generates and transmits a cryptographic pattern to the transaction processing system, which is used to verify that the merchant is complying with the transaction verification process. Embodiments of the invention can verify that, for a given transaction, both the portable communication device and the portable transaction device are present at the merchant before a transaction can be authorized and that the merchant is able to correctly generate a cryptographic pattern that is associated with the transaction, thereby reducing the risk that fraudulent transactions can be conducted by the user and the merchant.

According to some embodiments, a process for verifying a transaction may include the following steps. When a user with a portable communication device nears a beacon associated with a merchant store, in response to being awoken from receiving a transmission from the beacon, the portable communication device transmits its device information to the transaction processing system. The transaction processing system retrieves a primary account number (PAN) and a PAN expiration date of a portable transaction device that is associated with the portable communication device and generates a first cryptographic pattern using this information, along with one or more random numbers. The transaction processing system then transmits the first cryptographic pattern and the one or more random numbers to the portable communication device. The portable communication device then connects to a base station that is also associated with the merchant store and receives, from the base station, a universally unique identifier (UUID) that is built into the base station.

The portable communication device generates a second cryptographic pattern from the first cryptographic pattern and the UUID, and transmits the second cryptographic pattern and the one or more random numbers to the base station. The portable communication device also transmits the UUID to the transaction processing system. In response to receiving the UUID, the transaction processing system locally generates its own second cryptographic pattern using the first cryptographic pattern and the UUID.

At a later time, when the user conducts a transaction with the portable transaction device (which may be separate and different from the portable communication device) at a payment terminal of the merchant store, the payment terminal may obtain the PAN and expiration date from the portable transaction device. The payment terminal or a device external to the payment terminal may then generate its own first cryptographic pattern from the PAN and expiration date, generate its own second cryptographic pattern from the first cryptographic pattern and the UUID, and determine whether there is a match amongst the patterns that were recently received by the base station. If a match is found, the payment terminal may forgo other Cardholder Verification Methods (CVMs), (e.g., omit prompting the user for entry of a PIN or signature) and transmit at least a portion of the second cryptographic pattern with an authorization request message to the transaction processing system. The transaction processing system then determines whether any of the patterns it recently generated for the PAN matches the received portion. If a match is found, it can be determined that the portable communication device was present when the transaction was conducted, that the user of the portable transaction device is thereby authenticated and in fact authorized to use the portable transaction device, and that the merchant is in compliance.

Although many of the specific examples described below relate to payments, embodiments of the invention can apply to other types of transactions including physical location access transactions (e.g., a transaction in which a user may wish to enter a venue such as a train terminal) and data request access transactions (e.g., a transaction in which a user may wish to access information about their plane flight at a kiosk in an airport).

Prior to discussing the details of some embodiments of the present invention, description of some terms may be helpful in understanding the various embodiments.

A "portable communication device" may be a portable device that can be transported and be operated by a user, and may include one or more electronic components (e.g., an integrated chip, etc.). A portable communication device according to an embodiment of the invention may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A portable communication device may also be in the form of a vehicle (e.g., a car) equipped with communication capabilities.

Portable communication devices according to embodiments of the invention can be configured to communicate with external entities such as remote communication gateways through long range communications technologies and protocols. They may also be configured to communicate with external entities such as access devices using any suitable short or medium range communications technology including Bluetooth (classic and BLE—Bluetooth low energy), NFC (near field communications), IR (infrared), Wi-Fi, etc.

A "portable transaction device" may be a portable device that can be used to conduct a transaction. A portable transaction device may include a storage technology (e.g., electronic memory, magnetic stripe, etc.) to store credentials or tokens associated with an account of a user. A portable transaction device can be in any of the forms described above with respect to the portable communication device, or in the form of a card (e.g., integrated chip card, magnetic stripe card) or a fob, etc. In some embodiments, the portable transaction device and the portable communication device may be the same device, and need not be separate devices. Specific examples of portable transaction devices can include wearable devices, payment cards such as credit, debit, and prepaid cards, vehicles with remote communication capabilities, etc.

A "server computer" may include a powerful computer or duster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CW (card verification value), dCW (dynamic card verification value), CVV2 (card verification value 2), CVC3 card verification values, etc.

An "application" may be computer code or other data stored on a computer readable medium (e.g. memory element or secure element) that may be executable by a processor to complete a task.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

A "token provider" or "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "resource provider" may be an entity that can provide a resource such as goods, services, information, and/or access. Examples of resource providers include merchants (e.g., a supermarket), data providers such as government agencies, transit agencies (e.g., a train station), etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic pattern" may include cryptographically secure data. Examples of cryptographic patterns may include cryptographic hashes, encrypted data, etc.

Figure 1:
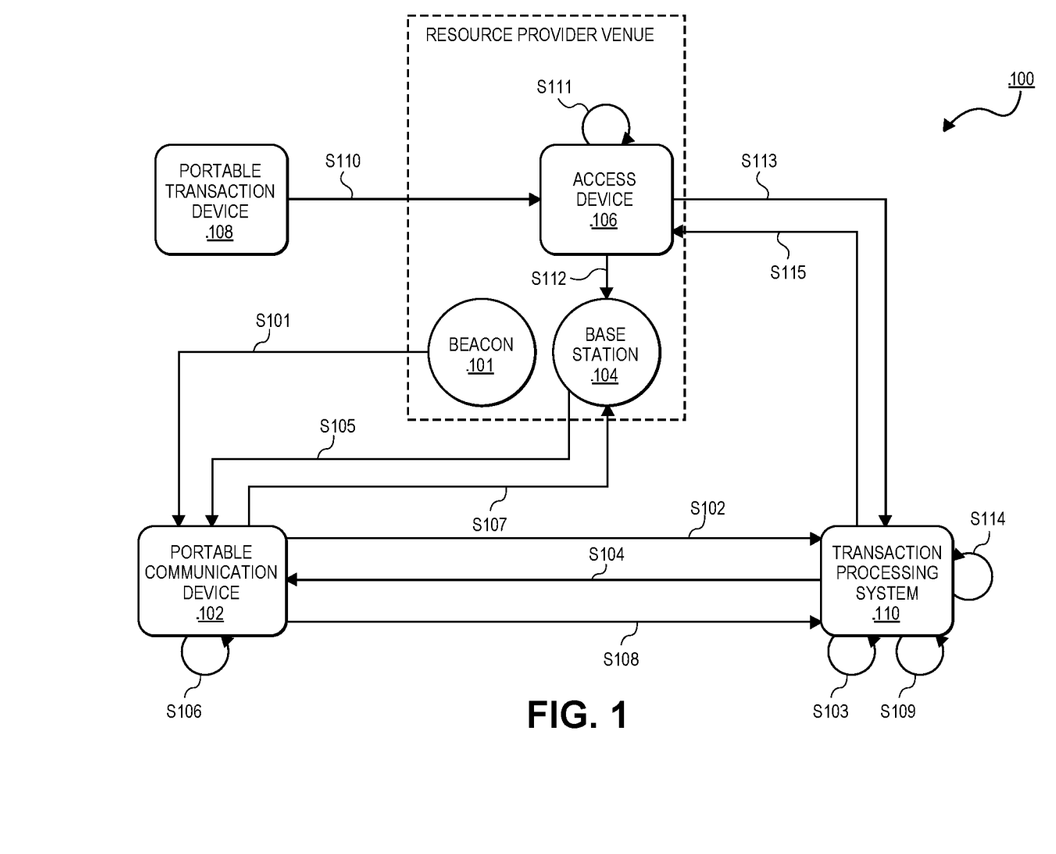
FIG. 1 shows a diagram of a system and a process flow according to embodiments of the invention.

FIG. 1 illustrates a system 100 according to an embodiment of the invention. The system 100 can be used to authenticate a user that is attempting to use a portable transaction device to conduct a transaction at a resource provider location.

System 100 includes a portable communication device 102 (e.g., a mobile phone), a beacon 101 (e.g., an in-venue BLE beacon), a base station 104 (e.g., an in-venue BLE base station or controller), an access device 106 (e.g., an in-venue POS terminal), a portable transaction device 108 (e.g., a card), and a transaction processing system 110.

The beacon 101 may perform periodic broadcasts that portable communication device 102 is in range to receive. The transaction processing system 110 can be in communication with the portable communication device 102 and the access device 106. The base station 104 may be in communication with the portable communication device 102 and the access device 106.

A user (not shown) may operate the portable communication device 102 and a portable transaction device 108. The portable communication device 102 may be a mobile phone, while the portable transaction device 108 may be a credit or debit card. If the user is authentic, then the beacon 101, portable communication device 102, the portable transaction device 108, the access device 106, and the base station 104 would all be located at the same location (e.g., the same resource provider, the same entrance to a venue, etc.).

The communication between portable communication device 102 and transaction processing system 110 can be performed using a secure communication protocol such as transport layer security protocol, secure sockets layer protocol, or other suitable secure communication protocols.

The access device 106 and the base station 104 can be coupled together or communicate in any suitable manner. For example, the access device 106 and the base station 104 may be connected by a physical wire, or may be connected through a short range wireless connection (e.g., as described below with respect to the base station 104).

The beacon 101 and the base station 104 can be uncoupled or coupled together. In some embodiments, the beacon 101 and the base station 104 can be embodied by the same device.

In some embodiments, BLE (Bluetooth Low Energy) technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

BLE advertising is a one-way communication method. Beacons (e.g. beacon 101) that want to be "discovered" can broadcast, or "advertise" self-contained packets of data in set intervals. These packets are meant to be collected by devices like smartphones, where they can be used for a variety of smartphone applications to trigger things like push messages, app actions, and prompts. An optimal broadcast interval can be 100 ms. Broadcasting more frequently uses more battery life but allows for quicker discovery by smartphones and other listening devices. Standard BLE has a broadcast range of up to 100 meters.

BLE stations can also be present in the base stations (e.g., base station 104) in embodiments of the invention. BLE stations can allow for two way communication with a mobile communication device. A base station (e.g., base station 104) may have, built into it, a UUID that can be transmitted to recipients. A recipient may use the UUID to identify the base station or an entity (e.g., a resource provider) that is associated with the base station.

Universally unique identifiers (UUIDs) may correspond to an identification scheme used to uniquely identify a particular entity from amongst a group of entities without significant central coordination. For example, each base station may be assigned a particular 128-bit value that serves as its UUID. A base station may then use its UUID to uniquely identify itself out of all other base stations within a particular environment. In some cases, each base station may be assigned its UUID at the time of its manufacture. In other cases, the base station may be given its UUID via configuration of its software or firmware.

The transaction processing system 110, which can be implemented as a cloud based system or as a server computer system, can be remotely located with respect to the portable communication device 102, the portable transaction device 108, the access device 106, and the base station 104.

The entities in FIG. 1 and the other Figures may communicate using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like.

Prior to conducting a transaction, a user may enroll the portable communication device 102 for the transaction service by downloading a transaction application (e.g., a payment application, mobile wallet application, etc.) onto the portable communication device 102. The user then links the portable communication device 102 to one or more portable transaction devices (e.g., the portable transaction device 108). The information regarding the portable communication device 102 and the user may be stored in the transaction processing system 110.

Additionally, a resource provider may obtain an identifier of the transaction processing system 110 from the transaction processing system (e.g., via a website associated with the transaction processing system) 110 and configure the beacon 101 to periodically broadcast the identifier. It should be noted that multiple resource providers or all resource providers may configure associated beacons to broadcast the same identifier.

Once the user is registered, the user walks into a resource provider venue with both the portable transaction device 108 and the portable communication device 102 installed with the transaction application. The resource provider venue may also include the access device 106 and the base station 104. The resource provider may be a merchant, a transit terminal, a building, etc.

At step S101, when the portable communication device 102 comes within range of the periodic wireless broadcasts (e.g., a beacon) of the beacon 101, the portable communication device 102 receives one of the beacons, which contains the transaction processing system's UUID. The broadcast may optionally include date/time information such as the current date and/or time (e.g., a time stamp). In response to receiving this particular UUID, the transactional application awakens within the portable communication device 102.

At step S102, portable communication device 102 (using the transactional application) may send a cryptographic pattern request to the transaction processing system 110 to request a cryptographic pattern from transaction processing system 110. The cryptographic pattern request may include device information such as a device ID identifying the portable communication device 102 and/or a device fingerprint of portable communication device 102, as well as any or all of the data obtained from the beacon transmission, and time information (e.g., date and/or time). Examples of device identifiers may include IMEI numbers, MSISDN numbers, UDID (Universal Device ID) numbers, SIM card numbers, etc. Examples of device fingerprints may include unique serial numbers assigned to unique hardware, web browser fingerprints, etc. Device information may also include account identifiers or other information specifically tied to a portable communication device 102. The device information in this example does not include real user credentials such as a real PAN. However, in other embodiments, instead of sending a device ID and/or device fingerprint, real credentials (or a payment token) may be sent by the portable communication device 102 to the transaction processing system 110.

At step S103, when transaction processing system 110 receives the cryptographic pattern request, transaction processing system 110 validates the device ID and device fingerprint against previous information provided from portable communication device 102 during enrollment. This is done to ensure that portable communication device 102 is an enrolled device, and that portable communication device 102 has not been hacked (e.g., jail-broken) or otherwise compromise with malware or viruses. The transaction processing system 110 then looks up an account identifier (e.g., a PAN) and an expiration date (or tokenized versions of the PAN and expiration date) associated with the portable communication device 102 using the device ID and/or device fingerprint (assuming that the PAN was not transmitted by the portable communication device 102). This can be done by electronically searching a database for the credential or token.

Once the account identifier and expiration date are obtained, the transaction processing system 110 generates a first cryptographic pattern (e.g., PAN patter). The first cryptographic pattern can be based on the account identifier, the expiration date of the account identifier, and, optionally, the current date. In some embodiments, a nonce may be added to the first cryptographic pattern to prevent replay attacks. In some embodiments, the first cryptographic pattern can be the result of hashing these data elements and taking a predetermined number of bytes of the hashed data elements. The predetermined number of bytes may be the most significant four bytes of the hash result. In some embodiments, transaction processing system 110 may sign the first cryptographic pattern using a private key of a public/private key pair. The transaction processing system 110 may also log the time of the cryptographic pattern request.

At step S104, transaction processing system 110 responds to the cryptographic pattern request by sending the first cryptographic pattern along with any corresponding nonce to the portable communication device 102. It should be noted that the portable communication device 102 may be associated with more than one PAN. In this case, the transaction processing system 110 may use the device ID and device fingerprint to retrieve multiple PANs, and use each PAN to generate a cryptographic pattern. The cryptographic patterns may then be returned to the portable communication device 102

At step S105, after the portable communication device 102 receives the cryptographic pattern along with any corresponding nonce, the portable communication device 102 begins scanning for nearby base stations. Once it finds the base station 104, the portable communication device 102 initiates a connection with the base station 104 and receives a UUID of the base station 104.

At step S106, the portable communication device 102 generates a second cryptographic pattern. The second cryptographic pattern can be based on the first cryptographic pattern and the UUID. In some embodiments, a nonce may be added to the second cryptographic pattern to prevent replay attacks. In some embodiments, the second cryptographic pattern can be the result of hashing these data elements and taking a predetermined number of bytes of the hashed data elements. The predetermined number of bytes may be the most significant four bytes of the hash result. The transaction processing system 110 may also log the time of the cryptographic pattern request.

At step 107, the portable communication device 102 transmits the second cryptographic pattern to the base station 104, along with any corresponding nonce. In response, the base station 104 stores the second cryptographic pattern (e.g., in a table) for later retrieval by the access device 106. In some embodiments, the base station 104 transmits both the cryptographic pattern and its UUID, and optionally the nonce, to the access device 106. These elements are stored within the access device 106 for later usage. In embodiments in which the cryptographic pattern is signed by transaction processing system 110, either the base station 104 or the access device 106 can be provided with a corresponding public key of the private/public key pair to validate the signature.

At step S108, the portable communication device 102 transmits the UUID of the base station 104 to the transaction processing system 110. In some embodiments, the portable communication device 102 may also transmit the first cryptographic pattern, the device ID, and/or the device fingerprint to the transaction processing system 110 to inform the transaction processing device 110 which cryptographic pattern the transmitted UUID is associated with. Furthermore, to prevent replay attacks, the portable communication device 102 may also generate and transmit a nonce along with the UUID to the transaction processing device 110.

At step 109, the transaction processing system 110 locally generates its own second cryptographic pattern. The second cryptographic pattern can be based on the first cryptographic pattern and the UUID. In some embodiments, the second cryptographic pattern can be the result of hashing these data elements and taking a predetermined number of bytes of the hashed data elements. The predetermined number of bytes may be the most significant four bytes of the hash result. The transaction processing system 110 may also log the time of the generation of the second cryptographic pattern At step S110, the user conducts a transaction by interacting portable transaction device 108 with access device 106.

The portable transaction device 108 may interact with the access device 106 using any suitable contact based method (e.g., using a magnetic stripe or electrical contacts) or contactless based method (e.g., using NFC, Bluetooth, WI-Fi, etc.).

At step S111, the access device 106 reads the account credentials (e.g., account identifier such as a PAN, expiration date, etc.) stored on the portable transaction device 108, and locally calculate its own second cryptographic pattern. For example, access device 106 may first calculate the first cryptographic pattern by hashing the account identifier and expiration date read from the portable transaction device 108, and optionally the current date and/or a received nonce, and taking the most significant four bytes of the hash result. The access device 106 may then calculate the second cryptographic pattern by hashing the first cryptographic pattern and the UUID, which was supplied to the access device 104 from the base station 104.

At step S112, access device 106 compares the locally generated second cryptographic pattern against the list of cryptographic patterns stored in base station 104, and makes a local decision regarding the processing options for this transaction. A matching cryptographic pattern can be used as a cardholder (e.g., user) verification method (CVM) indicating to the issuer (or other authorizing entity) that the portable communication device 102 is present. For example, if the locally generated second cryptographic pattern matches a previously received cryptographic pattern (e.g., the second cryptographic pattern originally generated by the portable communication device 102), the access device 106 may omit prompting the user for entry of a PIN or signature to improve the user experience since the matching cryptographic pattern verifies that the portable communication device 102 is present. Also, since the presence of the portable communication device 102 has been confirmed as being present, additional user verification methods (such as requests for PINs or signatures) need not be performed.

After the access device 106 confirms that the authentic user is present, the access device 106 may then generate an authorization request message. The authorization request message may include any suitable information including a portion of the locally generated second cryptographic pattern (i.e., pattern portion). In some embodiments, the pattern portion may include the locally generated second cryptographic pattern in its entirety.

In some embodiments, the authorization request message may omit the pattern portion. For example, if the access device 106 determined that the second cryptographic pattern generated by the access device 106 matched a previously stored second cryptographic pattern, then the access device 106 may simply create an indicator that indicates that the match was successful and may embed this in the authorization request message. This will serve as proof of authentication to a downstream entity such as an acquirer, payment processing network, or issuer. The authorization request message may also include any other elements including a transaction amount, payment token or credential, etc.

At step S113, access device 108 sends the authorization request message including one or more of account credentials, a transaction cryptogram and the pattern portion to the transaction processing system 110.

At step S114, the transaction processing system 110 (or a server computer included within the system) can analyze the authorization request message to determine that the user of the portable communication device 102 is also conducting the transaction at the access device 206. In some embodiments, this can be done by determining if the pattern portion is present in the authorization request message and determining whether the pattern portion corresponds to (e.g., matches) one of the stored cryptographic patterns that was locally generated at the transaction processing system 110 for the account associated with the authorization request (i.e., for the PAN of the portable transaction device 108). For example, the transaction processing system 110 may find a match between the pattern portion and its own second cryptographic pattern that it generated and stored in step S109. Generally, a match between the pattern portion and the second cryptographic pattern is found when the bytes of the pattern portion are identical to those of the corresponding portion of the second cryptographic pattern. In embodiments where the pattern portion includes the entire cryptographic pattern, then a match would be found only if all bytes of the pattern portion were identical to those of the second cryptographic pattern.

In embodiments where the authorization request message includes an indicator rather than a pattern portion, the transaction processing system 110 may determine that the cryptographic pattern matching conducted at the access device 106 was successful by analyzing the indicator.

In particular, the transaction processing system 110 may attempt to match the pattern portion with a stored cryptographic pattern that was generated by the transaction processing system 110 within an allowable time window prior to the receipt of the authorization request message. An allowable time window may depend upon the circumstances of the particular location. For example, if the transaction is a transit transaction, then the allowable time period may be the normal arrival and waiting time to departure on a particular vehicle to a particular destination. If the transaction is a department store, than the time window could be a couple of hours or less. If the transaction is at a fast food restaurant, then the transaction time may be 30 minutes or less.

The transaction processing system 110 may also determine whether or not the transaction is authorized based upon other factors including whether there are sufficient funds or credit in the account that is being used to conduct the transaction. In other embodiments, the transaction processing system 110 may forward the authorization request to a downstream authorizing computer (not shown) and the authorizing computer may determine whether or not the transaction is authorized. If an authorizing computer makes the authorization decision, it will transmit an authorization response message back to the transaction processing system 110 with the authorization result.

At step S115, transaction processing system 110 sends the authorization response message to access device 106 indicating whether the transaction is approved or declined.

At the end of the day or at some other period of time, a clearing and settlement process can take place.

It should be noted that incorporating the UUID of the base station (e.g., the base station 104) into the second cryptographic pattern prevents an unauthorized person from being able to capture the second cryptographic pattern and use it at a second location in a fraudulent manner. For example, by eavesdropping into communications between the entities in FIG. 1, a fraudster may be able to steal the second cryptographic pattern. However, when the fraudster attempts to use the second cryptographic pattern at another resource provider to perform a fraudulent transaction, it will not work. This is because the other resource provider's base station and the base station 104 have different UUID's, and the stolen cryptographic pattern would fail to match any cryptographic pattern locally generated by the transaction processing system 110 that is associated with the other resource provider.

During operation, several actions may be taken to avoid theft in stores, where, after the thief steals the portable transaction device from a victim, the thief then waits inside the store while the victim leaves the store (not knowing that their portable transaction device 108 was stolen). For example, at the time of transaction, base station 104 can ping portable communication device 102 again. In this case, a mid-range wireless communication such as BLE is well-suited to estimate the distance to the portable communication device 102, so that the base station 104 can detect how far away the portable communication device 102 is to access device 106. A time-out for the cryptographic patterns can also be implemented to force a renewal or refresh if passed. Different time windows may be used depending on the type of store (fast food vs. furniture, for example).

It should be noted that although the access device 106 has been illustrated as a POS terminal, the system can also be used at an access device such as an ATM for the issuer to gain confidence that the withdrawal is legitimate. Although the form factor of the ATM is different from a POS terminal, the flows would be similar to those described above.

It should be also noted that although the portable communication device is illustrated as a mobile phone, and the portable transaction device is illustrated as a card, in some embodiments other pairs of devices can be used. For example, the portable communication device can be a wearable device such as a watch, and the watch can be used with a mobile phone or a card acting as the portable transaction device to perform the transaction flows described herein. As another example, the portable communication device can be a vehicle equipped with communication capabilities operated by the user at a drive-thru, and the vehicle can be used with a mobile phone, a wearable device, or a card acting as the portable transaction device to perform the transaction flows described herein.

Furthermore, although the base station is illustrated as communicating with the portable communication device using Bluetooth low energy (BLE) protocol, other types of short/mid-range wireless communication protocols such as Bluetooth or WiFi can be used. BLE may be more suitable than other protocols due to its low energy consumption, ability to estimate distance of the portable communication device, and the ability of auto-connection to a BLE-enabled portable communication device.

Figure 2:
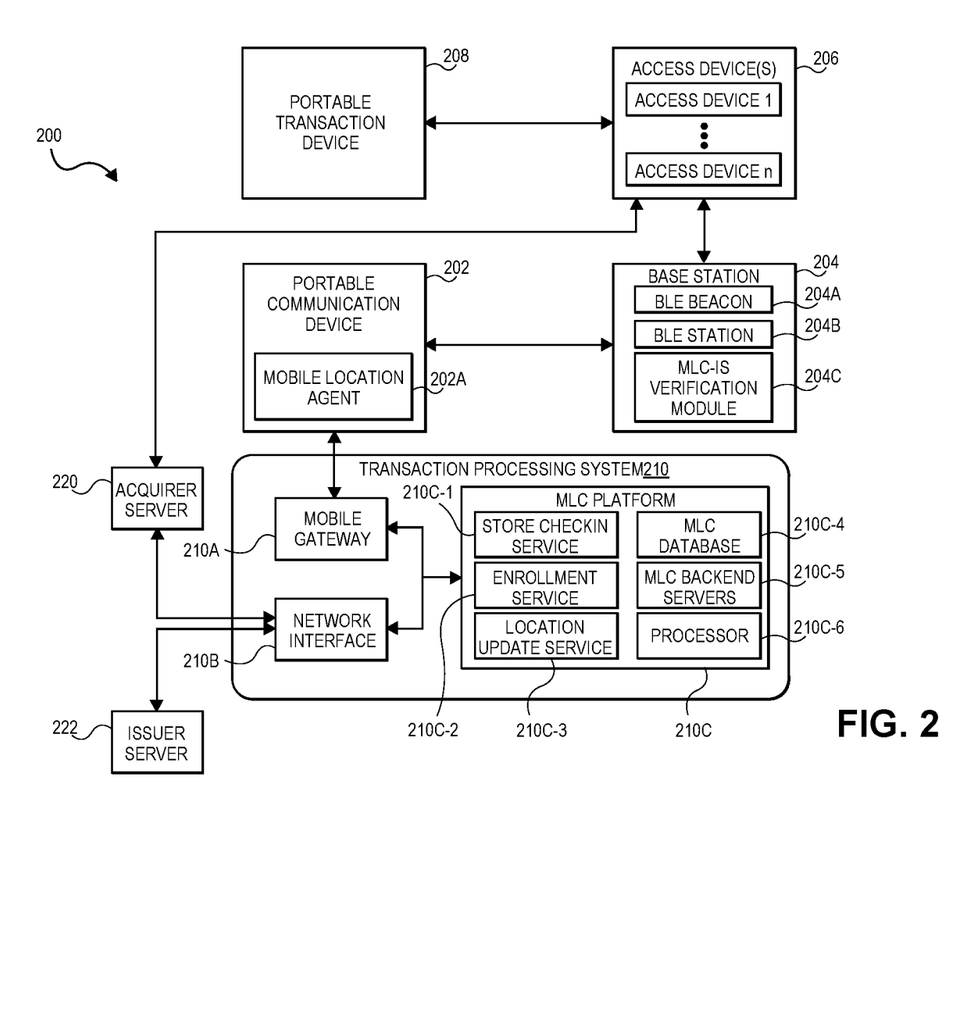
FIG. 2 illustrates a block diagram of a system, according to some embodiments of the invention.

FIG. 2 shows a block diagram of a system 200 according to an embodiment of the invention. The system includes a portable transaction device 208, one or more terminals 206, a base station 204, a portable communication device 202, an acquirer server, 220, an issuer server 222, and transaction processing system 210.

The access devices 206 may include verification processing to query the MLC (mobile location confirmation) Verification Module 204C to determine the user's physical presence in the venue. In particular, an access device may attempt to match a second cryptographic pattern that was locally generated at the access device to another second cryptographic pattern that was recently stored at the MLC-IS Verification Module.

The transaction processing system 210 comprises a mobile gateway 210A, a network interface 210B, and an MLC platform 210C in communication with each other. The MLC platform may also comprise a store check in service 210C-1, an enrollment service 210C-2, a location update service 210C-3, an MLC database 210C-4, MLC backend servers 210C-5, and one or more data processors 210C-6.

In some embodiments, the transaction processing system 210 may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

In some embodiments, in response to receiving a cryptographic pattern request that includes the device ID of a portable communication device, the store check in service 210C-1 searches for the primary account number(s) (PAN) and PAN expiration date that are associated with the device ID. If PAN(s) and PAN expiration date(s) are found, the store check in service 210C-1 can perform the following for each pair of PAN and PAN expiration date:

Format the PAN and PAN expiration date into a compressed numeric. Compressed numeric data elements consist of two numeric digits (having value in the range Hex '0'-'9') per byte. These data elements can be left justified and padded with trailing hexadecimal 'F's.

Generate a new random number and save the value for later use.

Concatenate from left to right the PAN, PAN expiration date, and the random number generated Hash the result of the concatenation using the SHA-256 hashing algorithm to obtain the 32-byte hash result.

Convert the binary string of hash value into a Base64 string using Base64 data encoding.

As shown above, the result of the concatenation is used as input to the SHA-256 hashing algorithm to obtain the 32-byte hash result. It should be noted that the SHA-256 hashing algorithm may correspond with a particular hash function and/or encryption algorithm known in the art. Other hash functions may be used without diverting from the essence of the disclosure. Some examples of other hashing functions are MD5, SHA-1, HMAC, linear hashes, rolling hashes, or the like.

The store check in service 210C-1 can return an encoding (e.g. Base64) of the string of hash value(s) and random number(s) generated for each pair of PAN and PAN expiration date found, and can also return the status code and the corresponding message as the API response. If PAN and PAN expiration date are not found, the store check in service 210C-1 can return the status code and the corresponding message as the API response.

The enrollment service 210C-2 can assist the process of registering users of portable transaction devices into the MLC platform 210C, which, for a given user, includes the step of associating, within the MLC database 210C-4, device information of the user's portable communication device with the PANs of the user's one or more portable transaction devices.

The portable communication device 202 may comprise a mobile location agent 202A. The mobile location agent 202A may be programmed to provide for beacon detection capability—this capability is required to wake up or notify the mobile location agent 202A once the cardholder/mobile device owner enters into a resource provider venue where the beacon monitors. It may also provide for BLE connection management—the mobile location agent 202A can be used to set up and manage a BLE connection with the base station to send store check in information to the store controller BLE.

The base station 204 may be in any suitable form (e.g., a single device with a single housing, multiple devices with multiple housings, any suitable combination of software and/or hardware, etc.) comprise a BLE beacon 204A, a BLE station 204B, and an MLC verification module 204C. Although the BLE beacon 204A is illustrated in the base station 204, it may be present in other devices (e.g., a separate device) in other embodiments or the invention. The BLE beacon 204A is a device that constantly advertises a predefined BLE data package that includes the identifier of a transaction processing system. It can be used to notify the user's portable communication device when the user walks into a resource provider venue (e.g., a merchant store). The BLE station 204A can be a device that exchanges information with the portable communication device 202 over the BLE channel. It is used to receive the cryptographic patterns from the portable communication device 202. The verification module 204C can be used to store the cryptographic patterns, receive the hash matching request from the access device, perform the hash matching, and return the hash matching results back to the access device. Although the verification module 204C is illustrated in the base station 204, it may be present in other devices (e.g., the access device) in other embodiments of the invention.

Figure 3:
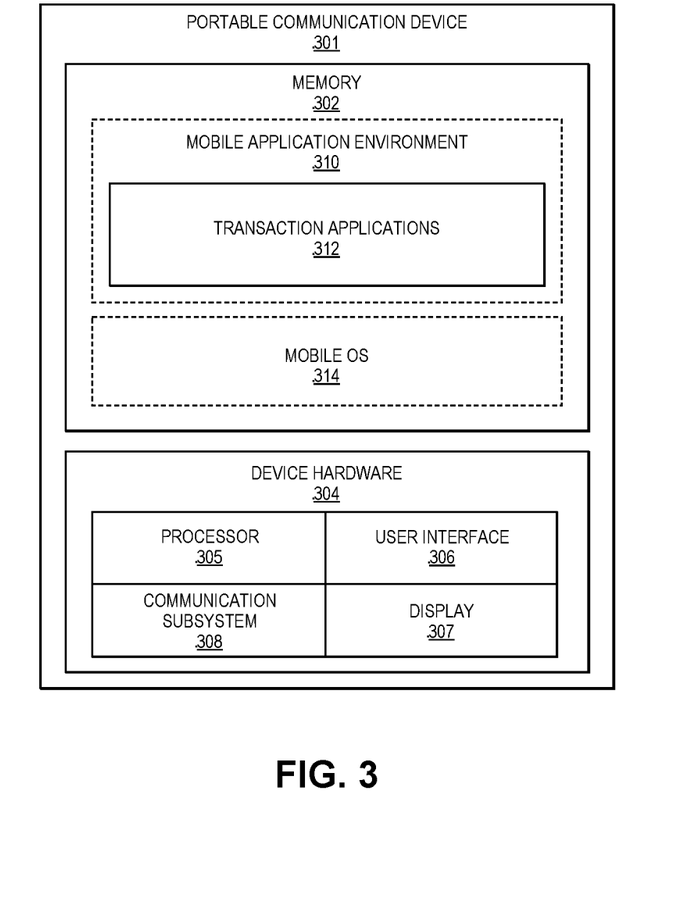
FIG. 3 shows a block diagram of a portable communication device according to an embodiment of the invention.

FIG. 3 illustrates a block diagram of a portable communication device 301, according to some embodiments. Portable communication device 301 may include device hardware 304 coupled to a memory 302. Device hardware 304 may include a processor 305, a communications subsystem 308, user interface 306, and a display 307 (which may be part of user interface 306). Processor 305 can be implemented as one or more integrated circuits (e.g., one or more single core or multicore microprocessors and/or microcontrollers), and is used to control the operation of portable communication device 301. Processor 305 can execute a variety of programs in response to program code or computer-readable code stored in memory 302, and can maintain multiple concurrently executing programs or processes. Communications subsystem 309 may include one or more RF transceivers and/or connectors that can be used by portable communication device 301 to communicate with other devices and/or to connect with external networks. User interface 306 can include any combination of input and output elements to allow a user to interact with and invoke the functionalities of portable communication device 301. In some embodiments, display 307 may be part of user interface 306.

Memory 302 can be implemented using any combination of any number of non-volatile memories (e.g., flash memory) and volatile memories (e.g., DRAM, SRAM), or any other non-transitory storage medium, or a combination thereof media. Memory 302 may store a mobile OS 314 and a mobile application environment 310 where one or more mobile applications reside 312 (e.g., a payment application such as a mobile wallet application, merchant application, mobile location application, etc.) to be executed by processor 305.

Figure 4:
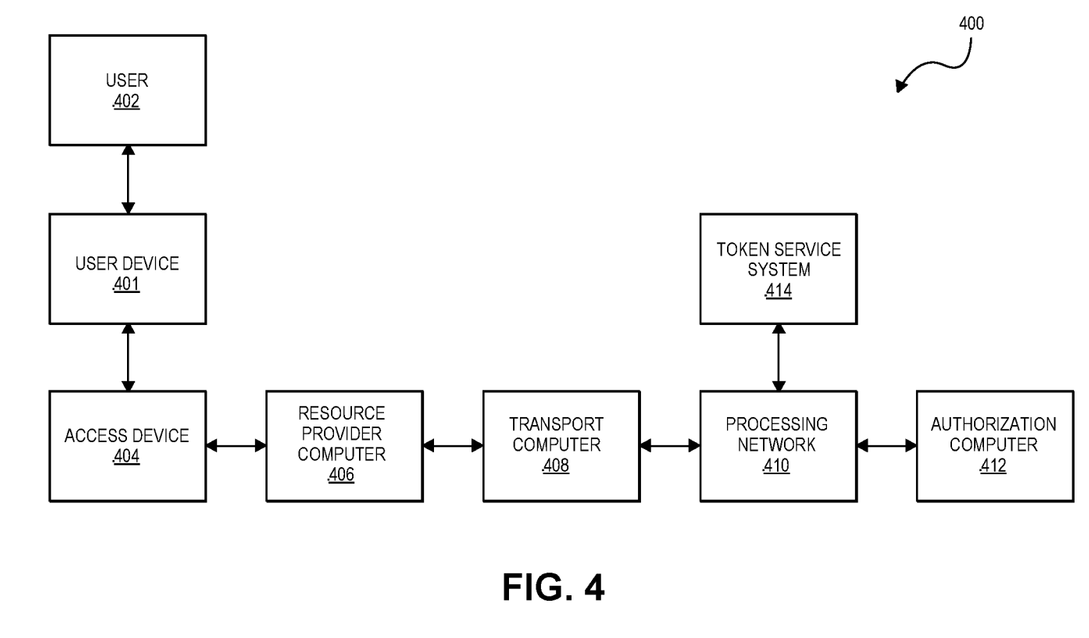
FIG. 4 shows a block diagram of an exemplary transaction processing system according to an embodiment of the invention.

FIG. 4 shows a diagram of a transaction processing system 400 that can incorporate any of the previously described systems. The transaction processing system 401 includes a user device 401 that is operated by a user 402. The user device can interact with an access device 404, and can be the previously described portable transaction device. The access device 404 is in communication with an authorization computer 412 via a resource provider computer 406, a transport computer 408, and a processing network 410. A token service system 414 may be in communication with the processing network 410 (or may be incorporated within it). The processing network 410 may include the previously described transaction processing system.

In a transaction conducted using the system 400, the user may use the user device 401 to interact with the access device 404. The access device may then generate and transmit an authorization request message to the processing network 410 via the resource provider computer 406 and transport computer 408. If the authorization request message contains a token such as a payment token, the processing network 410 may retrieve real credentials associated with the token from the token service system 414 and may replace the token with the real credentials in the authorization request message. The authorization request message may then be forwarded to the authorization computer 412 for an authorization decision.

After the authorization computer 412 makes the authorization decision, it returns an authorization response back to the access device 404 via the processing network 410, the transport computer 408, and the resource provider computer 406. If desired, the processing network 410 may replace the real credentials in the authorization response message with a previously provided token. As noted above, a clearing and settlement process may be subsequently performed.

Figure 5:
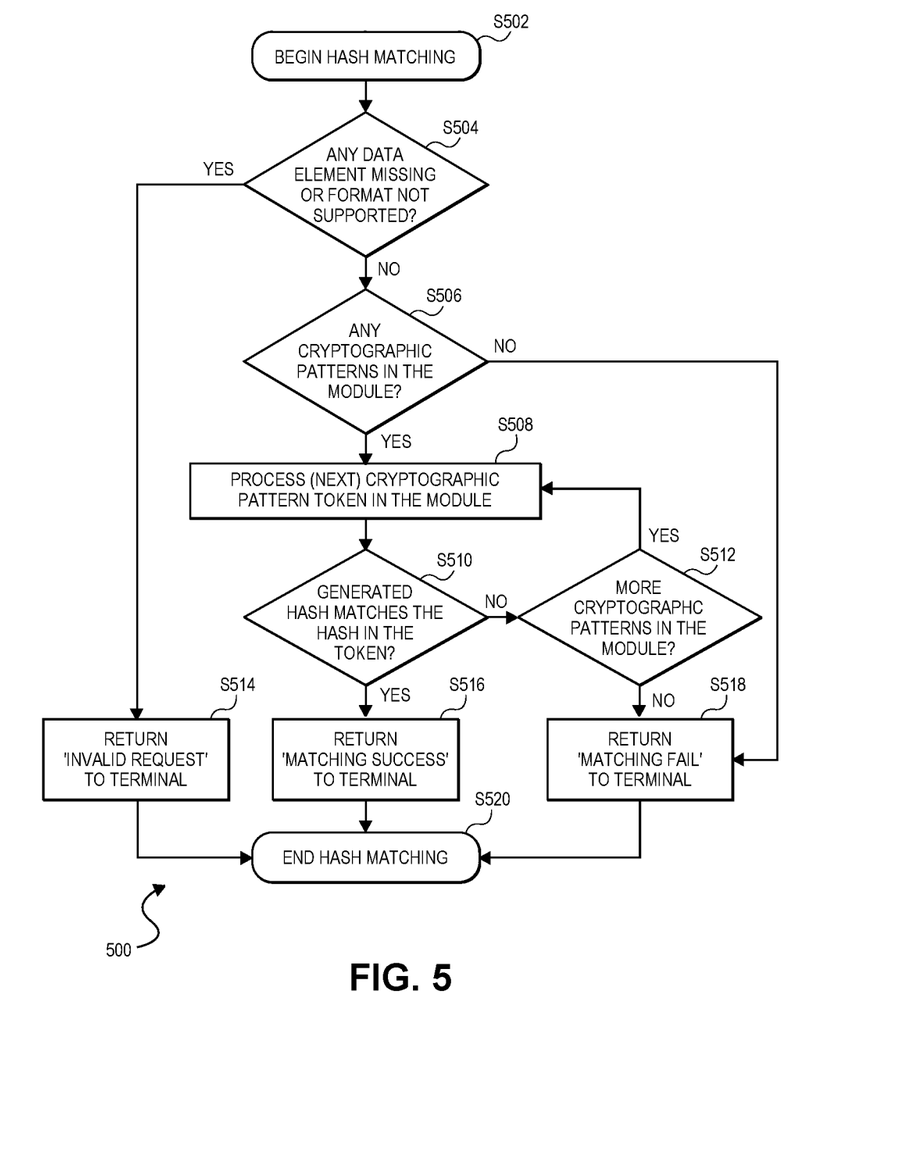
FIG. 5 shows a flowchart of a hash matching process according to an embodiment of the invention.

FIG. 5 shows a flowchart illustrating a hash matching process according to an embodiment of the invention. The hash matching process can be performed by a base station, access device, and/or transaction processing system, as described above in FIGS. 1 and 2.

At step S502, the hash matching process can begin.

At step S504, a decision is made, by a device, as to whether any data elements are missing and/or if the format is not supported. In step S514, if there are data elements that are missing and/or if the format is not supported, then an invalid request indicator is generated by the device.

At step S506, a decision is made, by the device, as to whether any cryptographic patterns are in the device being used.

At step S508, if there are cryptographic patterns in the device, the received cryptographic pattern is processed by the device.

At step S510, a determination is made by the device as to whether a generated cryptographic pattern matches a stored cryptographic pattern.

At step S516, if there is a match, then a success indicator may be created by the device.

At step S512, if there is not a match, the device determines if there are more cryptographic patterns in the module. In step S518, if there are no further cryptographic patterns to test, then a failure indicator may be generated.

At step S520, the cryptographic pattern matching process ends.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention provide for a number of advantages. For example, by using an in venue base station, embodiments of the invention can accurately determine if an authentic user is actually conducting a transaction with a portable transaction device. A fraudster who does not have the user's portable communication device will not be able to conduct a transaction using the user's portable transaction device. Thus, unauthorized access to locations, unauthorized payment transactions, and unauthorized data requests can be prevented using embodiments of the invention. Further, as is apparent above, the verification of the user's authenticity at the location of the transaction can be verified before the user ever gets to the point of starting the transaction and the verification processing used in embodiments of the invention is secure. As a result, additional authentication processes (e.g., PIN or password requests, or signature) need not be used in embodiments of the invention. This reduces any friction that might be generated between the resource provider and the user as the result of the user not remembering his or her authentication data, or as a result of the increased transaction time that would otherwise result from additional authentication processing.

Additionally, while previous transaction processing systems may not have provided a way to protect against rogue resource providers that provide fraudulent authorization requests, locally generating cryptographic patterns at the portable communication device, the resource provider, and the transaction processing system, and verifying that the patterns match during transactions can ensure that the resource provider is in compliance. In particular, the matching of the pattern portion received with the authorization request from the resource provider with recent cryptographic patterns that were locally generated at the transaction processing system is done to ensure that the resource provider is generating its own second cryptographic pattern correctly.

Furthermore, previous transaction processing systems could require the resource provider to perform a registration process that involves (1) the resource provider submitting information that identifies the resource provider to the transaction processing system 110; (2) the transaction processing system generating, storing (e.g., within a database) and transmitting to the resource provider, an identifier that uniquely identifies the resource provider; and (3) the resource provider to configure its infrastructure (e.g., the base station or the access device) with the identifier. In contrast, some embodiments may uniquely identify a resource provider using a UUID that is natively provided by (e.g., built into) the base station used by the resource provider. In doing so, some embodiments may remove the registration process, thereby lowering the barrier for resource providers to participate in the system. Additionally, some embodiments may free the transaction processing system from having to generate and store identifiers for each participating resource provider.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Other embodiments of the invention are also contemplated. Other embodiments of the invention may include the following:

An additional embodiment is directed to a method comprising: receiving, by an access station from a portable communication device, a second cryptographic pattern that is derived from a base station identifier and a credential or a token; during a transaction that is conducted at the access device, receiving a credential or a token from a portable transaction device; generating another cryptographic pattern that is derived from at least the base station identifier and the received credential or token; comparing the second cryptographic pattern the other cryptographic pattern; and if the patterns match, sending an authorization request message that comprises at least a portion of the other cryptographic pattern to a server computer.

Another embodiment of the invention can be directed to an access device that includes code, executable by a processor, to perform the above described method.

Specific details regarding some of the above-described aspects are provided above. The specific details of the specific aspects may be combined in any suitable manner without departing from the spirit and scope of embodiments of the invention. For example, although the embodiments described above relate to authentication processing, other types of processing can be performed using embodiments of the invention. For example, since embodiments of the invention can verify that a user is actually at a specific location, embodiments of the invention could also be used to provide incentives or rewards to a user.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
generating, by a server computer, a first cryptographic pattern by hashing at least a credential or token, and a nonce;
sending, by the server computer to a portable communication device of a user, the first cryptographic pattern and the nonce, causing the portable communication device to perform scanning for nearby base stations and receive a base station identifier from a base station, the base station identifier comprising a universally unique identifier (UUID), wherein the portable communication device transmits the nonce to an access device via the base station;
receiving, by the server computer and from the portable communication device of the user, the base station identifier, the base station identifier comprising the universally unique identifier (UUID) uniquely identifying a resource provider location;
generating, by the server computer, a second cryptographic pattern, by hashing, by the server computer, at least the first cryptographic pattern and the base station identifier;
storing, by the server computer, the second cryptographic pattern;
receiving, by the server computer, from the access device in a transaction, an authorization request message comprising the second cryptographic pattern, after the access device forms the second cryptographic pattern by receiving the credential or token from a portable transaction device of the user, forming the first cryptographic pattern by hashing the credential or token, and the nonce, and then forming the second cryptographic pattern by hashing the first cryptographic pattern and the base station identifier comprising the universally unique identifier (UUID);
analyzing, by the server computer, the authorization request message by determining that the user of the portable communication device and the portable transaction device are conducting the transaction at the access device by determining that the second cryptographic pattern in the authorization request message matches the second cryptographic pattern stored by the server computer; and
at least in response to determining that the second cryptographic pattern in the authorization request message matches the second cryptographic pattern stored by the server computer, transmitting, by the server computer an authorization response message to the access device indicating that the transaction is approved, wherein the portable communication device, the base station, the user, and the portable transaction device are within the resource provider location which is a merchant store.

2. The method of claim 1, wherein the method further comprises, prior to receiving the base station identifier from the portable communication device:
associating, by the server computer, the credential or the token with device information within a database;

receiving, by the server computer, the device information from the portable communication device; and searching, by the server computer, the database for the credential or the token associated with the device information.

3. The method of claim 1, wherein the authorization request message comprises a transaction amount.

4. The method of claim 1, wherein the transaction is a payment transaction.

5. The method of claim 1, wherein the portable transaction device is in the form of a card and the portable communication device is a phone.

6. The method of claim 1, wherein the portable transaction device and the portable communication device are the same device.

7. The method of claim 1, wherein the portable communication device also forms the second cryptographic pattern by hashing at least the first cryptographic pattern and the base station identifier.

8. A system comprising:
a server computer comprising:
a processor; and
a computer readable medium comprising code, executable by the processor, for implementing a method comprising:
generating, by the server computer, a first cryptographic pattern by hashing at least a credential or token, and a nonce;
sending, by the server computer to a portable communication device of a user, the first cryptographic pattern and the nonce, thereby causing the portable communication device to perform scanning for nearby base stations and receive a base station identifier from a base station, the base station identifier comprising a universally unique identifier (UUID), wherein the portable communication device transmits the nonce to an access device via the base station;
receiving, by the server computer and from the portable communication device of the user, the base station identifier, the base station identifier comprising the universally unique identifier (UUID) uniquely identifying a resource provider location;
generating, by the server computer, a second cryptographic pattern, by hashing, by the server computer, at least the first cryptographic pattern and the base station identifier;
storing, by the server computer, the second cryptographic pattern;
receiving, by the server computer, from the access device in a transaction, an authorization request message comprising the second cryptographic pattern, after the access device forms the second cryptographic pattern by receiving the credential or token from a portable transaction device of the user, forming the first cryptographic pattern by hashing the credential or token, and the nonce, and then forming the second cryptographic pattern by hashing the first cryptographic pattern and the base station identifier comprising the universally unique identifier (UUID);
analyzing, by the server computer, the authorization request message by determining that the user of the portable communication device and the portable transaction device are conducting the transaction at the access device by determining that the second cryptographic pattern in the authorization request message matches the second cryptographic pattern stored by the server computer; and
at least in response to determining that the second cryptographic pattern in the authorization request message matches the second cryptographic pattern stored by the server computer, transmitting, by the server computer an authorization response message to the access device indicating that the transaction is approved, wherein the portable communication device, the base station, the user, and the portable transaction device are within the resource provider location which is a merchant store.

9. The system of claim 8, wherein the method further comprises, prior to receiving the base station identifier from the portable communication device:
associating, by the server computer, the credential or the token with device information within a database;
receiving, by the server computer, the device information from the portable communication device; and
searching, by the server computer, the database for the credential or the token associated with the device information.

10. The system of claim 8, wherein the authorization request message is an ISO 8583 message.

11. The system of claim 8, wherein the server computer is programmed to perform authorization and clearing and settlement.

12. The system of claim 8, wherein the portable transaction device is in the form of a card and the portable communication device is a phone.

13. The system of claim 8, wherein the portable transaction device and the portable communication device are the same device.

14. The method of claim 1, wherein the first cryptographic pattern is formed by:
formatting, by the server computer, at least the credential into a compressed numeric, wherein the compressed numeric comprise two numeric digits per byte;
generating, by the server computer, the nonce;
concatenating, by the server computer, the compressed numeric and the nonce; and
hashing, by the server computer, a result of the concatenation to form the first cryptographic pattern.

15. The method of claim 1, wherein the access device comprises the base station storing the base station identifier.

16. The method of claim 1, wherein the server computer stores a link between the portable communication device and the portable transaction device of the user.

17. The method of claim 1, wherein the second cryptographic pattern times out after a time window associated with the resource provider location.

18. The method of claim 1, wherein the first cryptographic pattern is formed using the token, wherein the token is a payment token.

19. The method of claim 1, wherein the universally unique identifier (UUID) is a 128-bit value that is assigned to the base station at a time of manufacture of the base station.

20. The method of claim 19, wherein the universally unique identifier (UUID) is unique to all other base stations.

* * * * *